(12) United States Patent
Klaven

(10) Patent No.: US 12,193,614 B2
(45) Date of Patent: Jan. 14, 2025

(54) OUTDOOR TABLE ORGANIZER AND COOKING UTENSIL CADDY

(71) Applicant: JAY Enterprises, LLC, Jackson, WY (US)

(72) Inventor: Jeffrey Klaven, Olympia, WA (US)

(73) Assignee: JAY ENTERPRISES, LLC, Jackson, WY (US)

( * ) Notice: Subject to any disclaimer, the term of this patent is extended or adjusted under 35 U.S.C. 154(b) by 143 days.

(21) Appl. No.: 17/657,207

(22) Filed: Mar. 30, 2022

(65) Prior Publication Data
US 2022/0313024 A1    Oct. 6, 2022

Related U.S. Application Data

(60) Provisional application No. 63/200,817, filed on Mar. 30, 2021.

(51) Int. Cl.
*A47J 47/16* (2006.01)
*A45C 7/00* (2006.01)

(52) U.S. Cl.
CPC ............. *A47J 47/16* (2013.01); *A45C 7/0095* (2013.01)

(58) Field of Classification Search
CPC ................................. A47J 47/16; A45C 7/0095
See application file for complete search history.

(56) References Cited

U.S. PATENT DOCUMENTS

| 3,180,485 | A | * | 4/1965 | Nevitt | A45C 7/0095 206/370 |
| 4,188,988 | A | * | 2/1980 | Agyagos | A45C 3/00 383/18 |
| 6,193,118 | B1 | * | 2/2001 | Kearl | A45F 4/02 224/655 |
| 6,508,183 | B2 | * | 1/2003 | Kerrigan | A47G 11/003 108/90 |
| 7,621,006 | B1 | * | 11/2009 | Tucker | A47G 9/0292 5/493 |
| 10,219,617 | B1 | * | 3/2019 | Taylor | A47B 23/046 |
| 2003/0089749 | A1 | * | 5/2003 | Valdez-Campbell | A45F 4/02 383/4 |
| 2004/0016055 | A1 | * | 1/2004 | Lamy | A47G 9/02 5/503.1 |
| 2009/0151607 | A1 | * | 6/2009 | McLemore | A47B 23/046 108/91 |
| 2017/0202326 | A1 | * | 7/2017 | Rieser | A45C 3/004 |
| 2017/0291710 | A1 | * | 10/2017 | Barr-Perea | B61D 33/0007 |
| 2020/0009897 | A1 | * | 1/2020 | Mehringer | A45C 3/02 |

* cited by examiner

*Primary Examiner* — Derek J Battisti
(74) *Attorney, Agent, or Firm* — Andrew F. Young; NOLTE LACKENBACH SIEGEL

(57) ABSTRACT

A table organizer and cooking utensil caddy having a rectangular fabric panel partitioned into subpanels and configured for placement on the end of a picnic tabletop. Subpanels include a central tabletop panel, which rests on the tabletop, and a left-side pocket panel, right-side pocket panel, and front pocket panel configured to drape over the edges of the tabletop. A tie-down strap affixed to the bottom side of the tabletop panel enable a user to strap the caddy to the picnic table. Carry handles are exposed when the pocket panels are folded onto the top side and then enclosed by folding the entire caddy in half. The tie-down strap then secures the caddy in a folded configuration and facilitates storage and transport of myriad cooking utensils and articles presented for use in a deployed configuration.

2 Claims, 7 Drawing Sheets

OUTDOOR TABLE ORGANIZER AND COOKING UTENSIL CADDY

CROSS REFERENCES TO RELATED APPLICATIONS

The present application claims the benefit of U.S. Provisional Patent Application Ser. No. 63/200,817, filed Mar. 30, 2021 (Mar. 30, 2021), which application is incorporated in its entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention: The present invention relates most generally to tool caddies, and more particularly to tool caddies for transporting and organizing tools and accessories, and still more particularly to a foldable fabric outdoor table organizer and cooking utensil caddy for storing, organizing, transporting, and presenting cooking utensils and kitchen articles on an outdoor picnic table.

Background Discussion: Equipment caddies of nearly every conceivable kind are known: shower caddies, shop and garden tool caddies, chef's knife roll bags, and the like, have long been employed to organize, store, transport, and then display articles and tools of various kinds. Many are made from fabric, include a plurality of pockets or other storage compartments, and are configured to fold or roll up into a storage/transport configuration which is easily carried and then easily deployed at the site where stowed articles are to be used. Many are also designed to open into a generally flat deployment configuration suitable for placement on a flat surface (a countertop, tabletop, or floor) where all or a portion of the stowed articles may be seen in the storage pocket or compartment and are simply laid out in front of a user for easily selection. Further, many prior art designs are configured for placement over a support of some kind; for instance, a bucket, folding chair, rolling tool chest or rolling luggage handle, ladder, door, chair, and so on.

Despite the ingenuity that has driven the creation of countless designs, none have been directed to a caddy specifically suited to the storage, transport, and then use of kitchen articles and utensils at a picnic table barbeque. The instant invention addresses this need.

BRIEF SUMMARY OF THE INVENTION

The present invention is an outdoor table organizer and cooking utensil caddy configured to drape over the end of a picnic tabletop. It is a fabric panel with a plurality of pockets, sleeves, and fabric straps (elastic and non-elastic) to stow, organize, transport, and present various cooking utensils, plates, spices, tools and accessories for preparing and serving meals in an outdoor setting. It may be variously referred to herein as either the outdoor table organizer or the picnic caddy. Once the picnic caddy has been packed, it can be neatly folded into a folded configuration (in embodiments having an approximate 15×18 inch rectangular shape and dimensions). It also includes two fabric handles and a plastic slide release buckle to lock the caddy into its folded, travel configuration.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
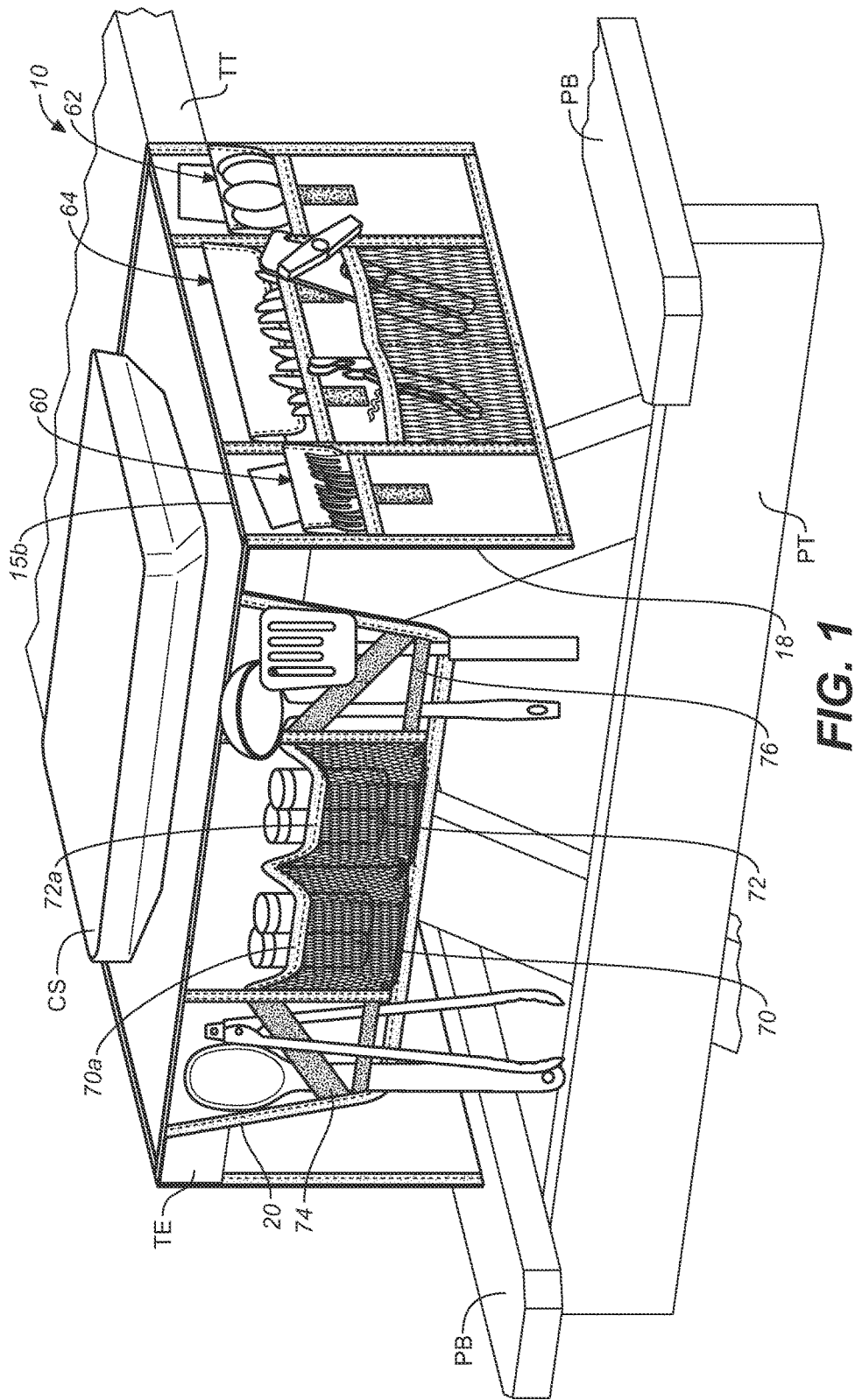
FIG. 1 is an upper perspective view showing the inventive outdoor table organizer and cooking utensil caddy of the present invention disposed on a tabletop.

Referring to FIGS. 1 through 6, wherein like reference numerals refer to like components in the various views, there is illustrated therein a new and improved outdoor table organizer and cooking utensil caddy, generally denominated 10 herein.

Figure 4:
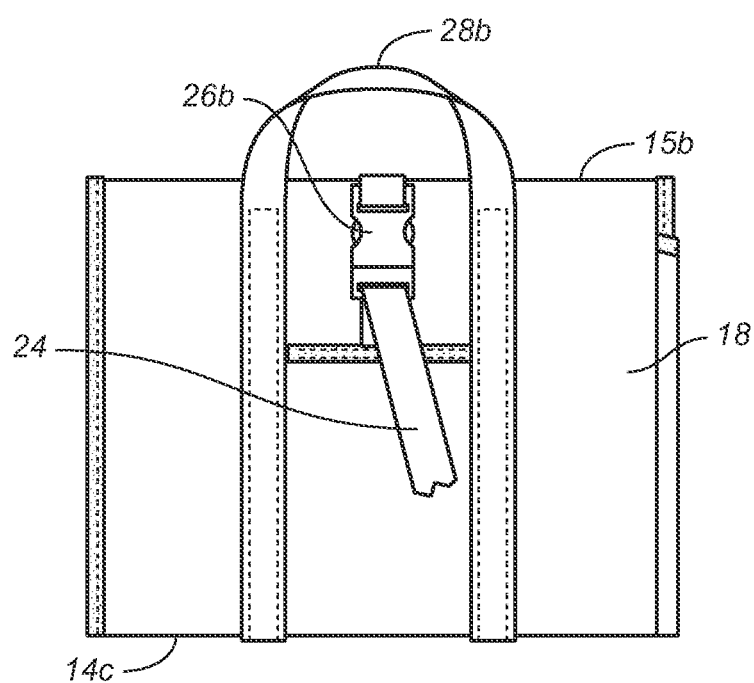
FIG. 4 is side view in elevation showing the outdoor table organizer folded into the storage and transport configuration.
Figure 5:
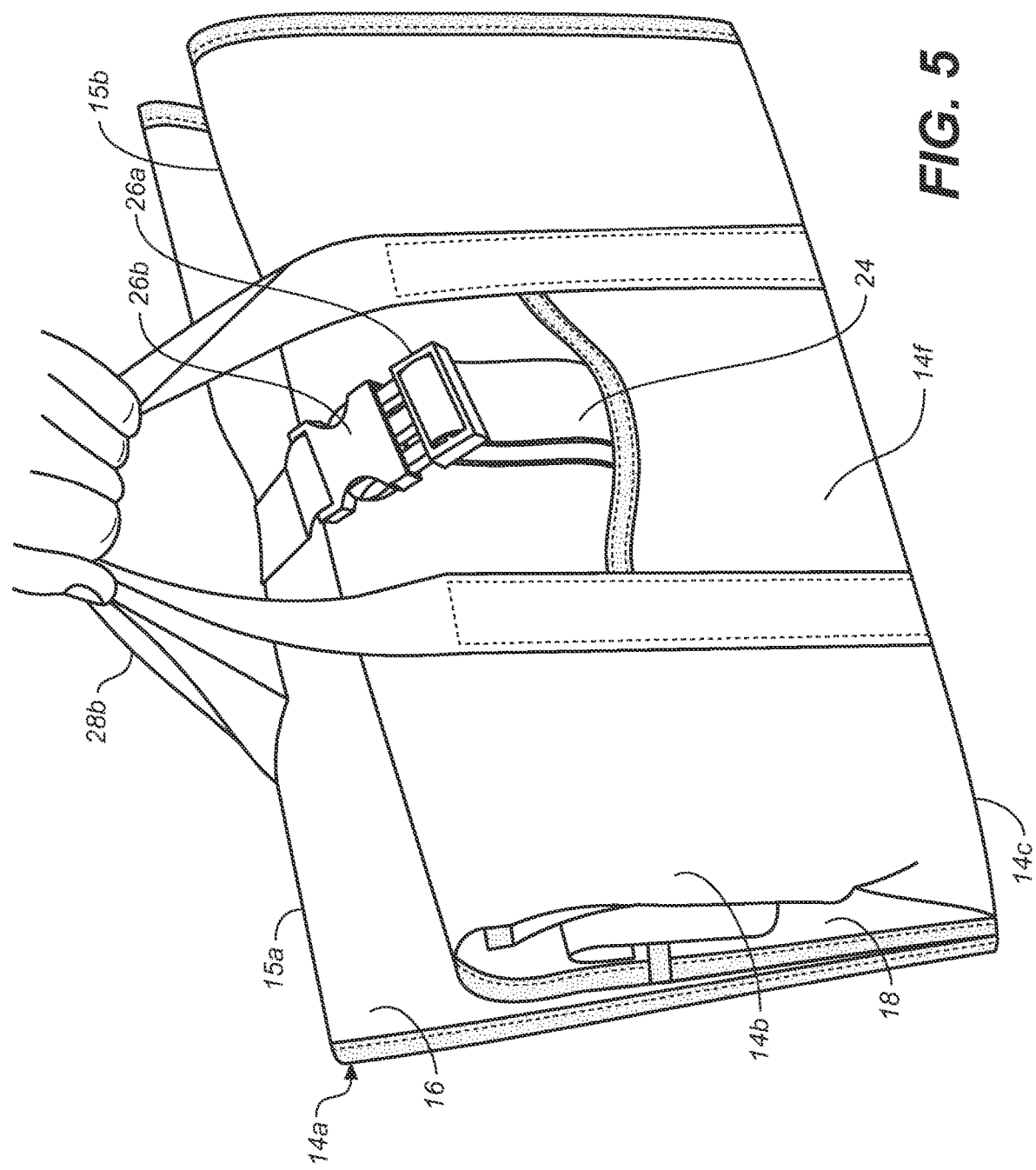
FIG. 5 is an upper perspective view thereof.
Figure 6:
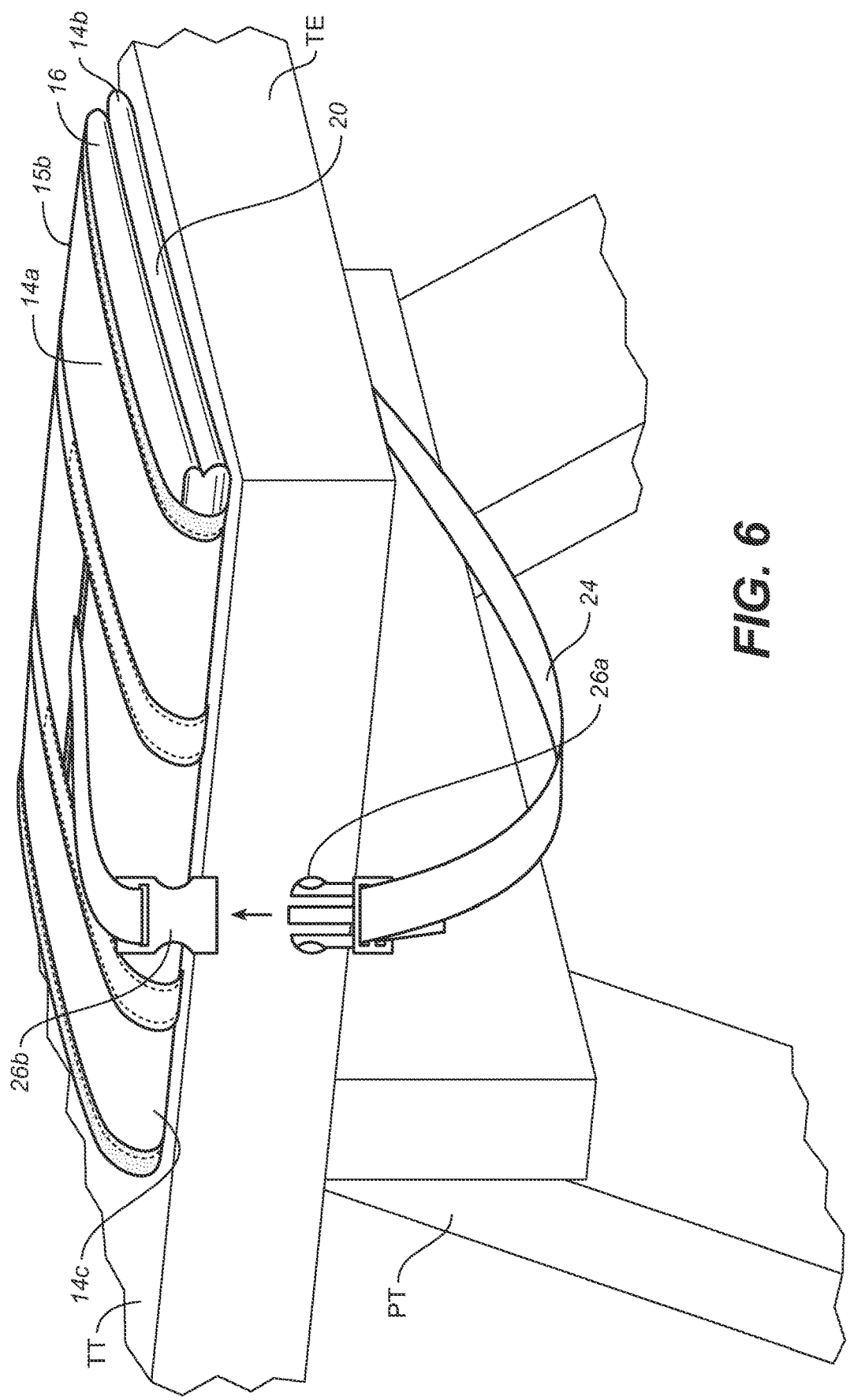
FIG. 6 is a left front perspective view showing how the outdoor table organizer is secured to a picnic table using its tie-down strap.

FIGS. 1-6 illustrate an embodiment 10 of the outdoor table organizer of the present invention. The various views show that the apparatus includes, in its most essential aspect, a flexible fabric base panel 12, which is partitioned by seams into subpanels, including a tabletop panel 14, a left side pocket panel 16, a right-side pocket panel 18, and a front pocket panel 20. The caddy has a fully open configuration suitable for placement on a flat surface, as seen for instance in FIG. 2B, or for placement on the tabletop TT proximate the end TE of a picnic table PT or other kind of table, as seen in FIG. 1 and partly in FIG. 6. The seams between subpanels 15a, 15b, 15c, provide the lines along which folds may be made to reconfigure the caddy in a form suited to storage and transport of articles stowed in the caddy, as seen in FIGS. 4-5. Thus, the seams divide the caddy into discrete subpanels for dedicated storage compartments and also facilitate configuring the caddy to carry out its purposes—storage, transport, and presentation for use—of various cooking articles and accessories.

The fabric base panel is preferably fabricated from a high-tenacity woven nylon or polyester fabric, such as 600 denier (600D) polyester fabric, 500D nylon, CORDURA, or suitable alternatives of comparable strength. Lightweight alternatives such as 300D, 400D, 500D, and 210D polyester fabrics are also contemplated. [CORDURA is a registered trademark of INVISTA North America of Wichita, Kansas.]

The tabletop panel of the caddy includes equally sized left and right medial panels, 14a, 14b, divided by a transversely oriented middle folding seam 14c, which also divides the caddy in half in its longest dimension and functions as the folding seem for placing the caddy in a folded, storage-and-transport configuration. The tabletop panel is rectangular in shape and has a length 14d sized to span the width (generally) of a conventional picnic table, i.e., 29½ inches. The tabletop panel also has an upper side 14e and a bottom side 14f, the latter which spreads over and comes into contact with the picnic tabletop. The width 12a of the tabletop panel and the longer dimension of the left-side pocket panel and right-side pocket panel are equal at approximately 18 inches, and the left side and right pocket panels have a shorter dimension of approximately 11 inches. With fabric thickness and other tolerances considered, this enables the left-side and right-side pocket panels, as well as the front pocket panel, to fold interiorly, onto the top side of the tabletop panel 14 (i.e., the upper and interior sides of the left and right medial panels 14a, 14b), so as to be entirely enclosed within the caddy in the folded configuration for easy transport.

The caddy further includes a longitudinally disposed tie-down strap 24 with a segment or portion 24a sewn or otherwise affixed to the backside of the tabletop panel. The tie-down strap includes free left and right ends, 24b, 24c, respectively, with complementary female and male quick release slide buckles 26a, 26b adjustably disposed on the ends, which provide the means to secure the caddy to a picnic tabletop, as can best be seen in FIG. 1 and FIG. 6.

As will be appreciated from the views, the sewn portion of the tie-down strap does not extend to the left and right pocket panel seams, such that the caddy can be installed on narrow tables (i.e., narrower than the width of the two medial panels combined), and thus with some adjustment made for articles stored in the medial panels. The buckles on the free ends of the tie-down can be adjusted to tightly secure the caddy to a table when the buckles are snapped together and the male end tail is pulled tight, in a manner well known in the art. Further, a storage sleeve 25 enables excess or unused tie-down strap to be captured and stored.

Next, the caddy includes a continuous loop of medium weight cotton or polypropylene webbing (poly strap) 28 sewn along spaced apart lengths to the bottom side of the tabletop panel, with free left and right handle portions 28a, 28b, respectively, which extend above and outside seams 15a, 15b, which define the upper edges of the caddy when in the folded storage-and-transport configuration. Thus, these portions of the webbing provide carry handles when the caddy is in the folded storage-and-transport configuration.

Note should be taken that in embodiments, fabric edges along the perimeter of the caddy, along pocket edges, and at the seams may be reinforced with binding, such as a fabric webbing interface or edge tape.

Figure 2A:
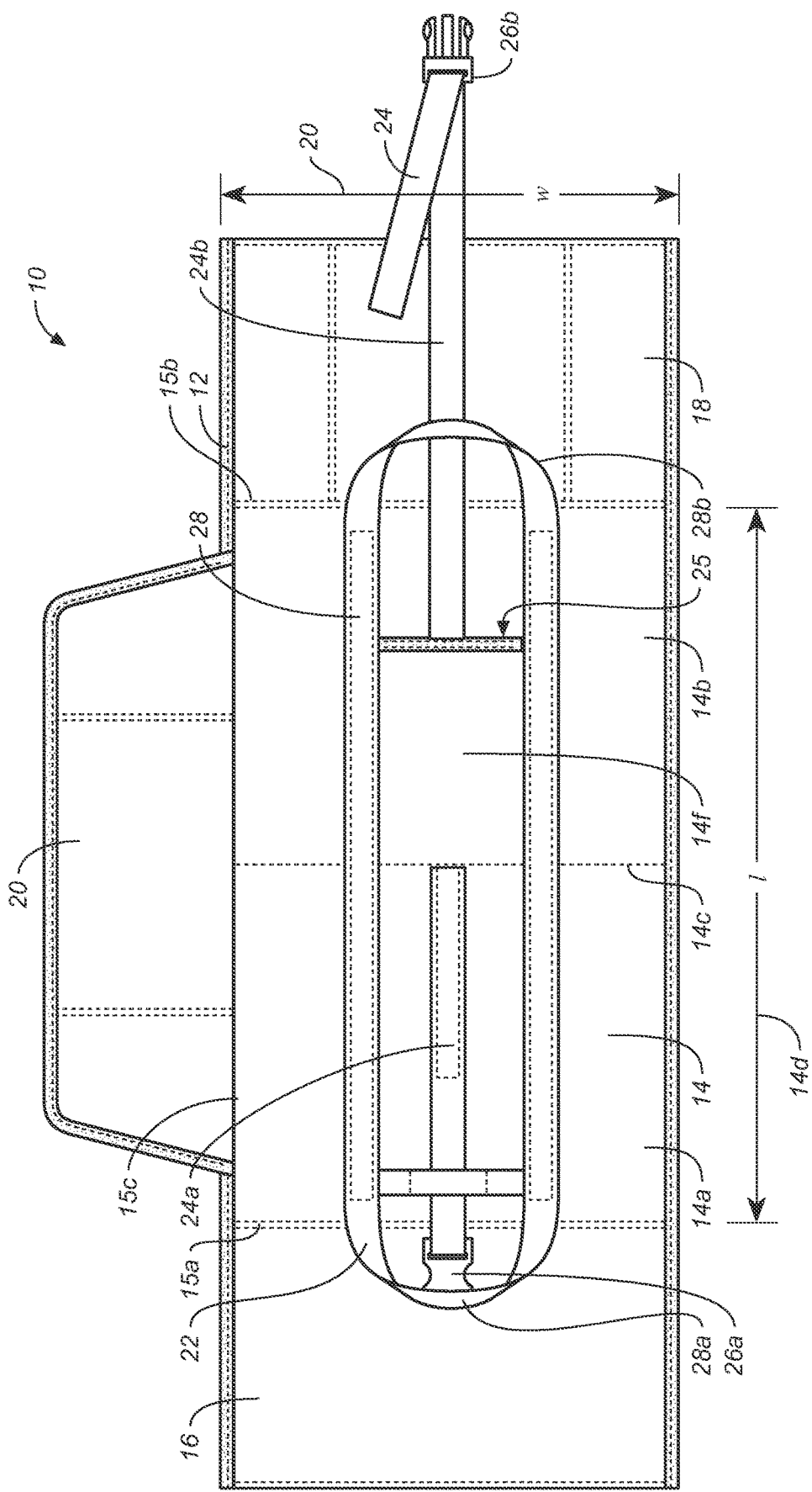
FIG. 2A is a bottom view of the outdoor table organizer in a fully unfolded (deployed) configuration with all caddy panels in the same horizontal plane.
Figure 2B:
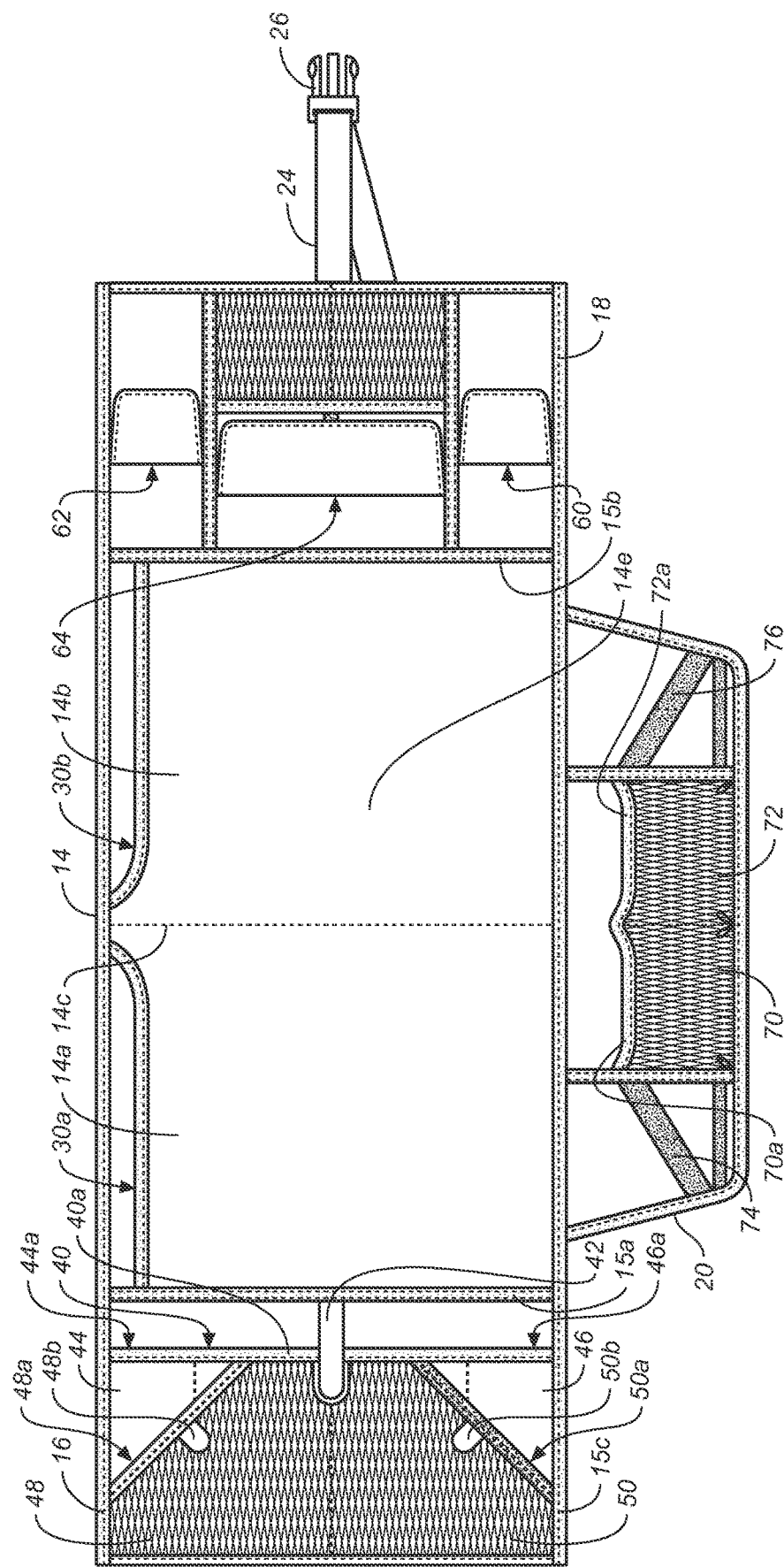
FIG. 2B is a top plan view thereof, showing the top side of the caddy, which is the interior side when in the folded configuration.
Figure 2C:
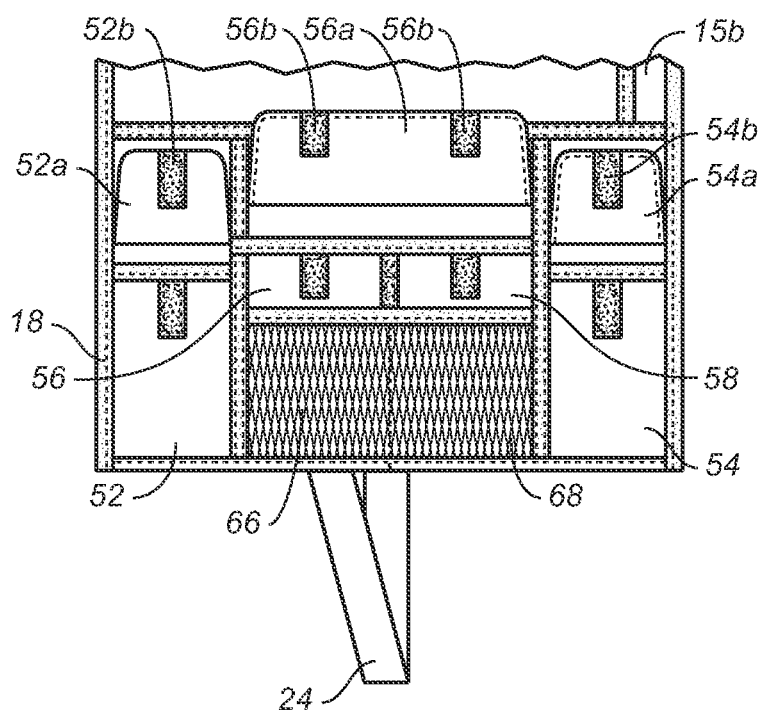
FIG. 2C is a right, side view in elevation showing the right panel folded down and its pockets open.
Figure 3:
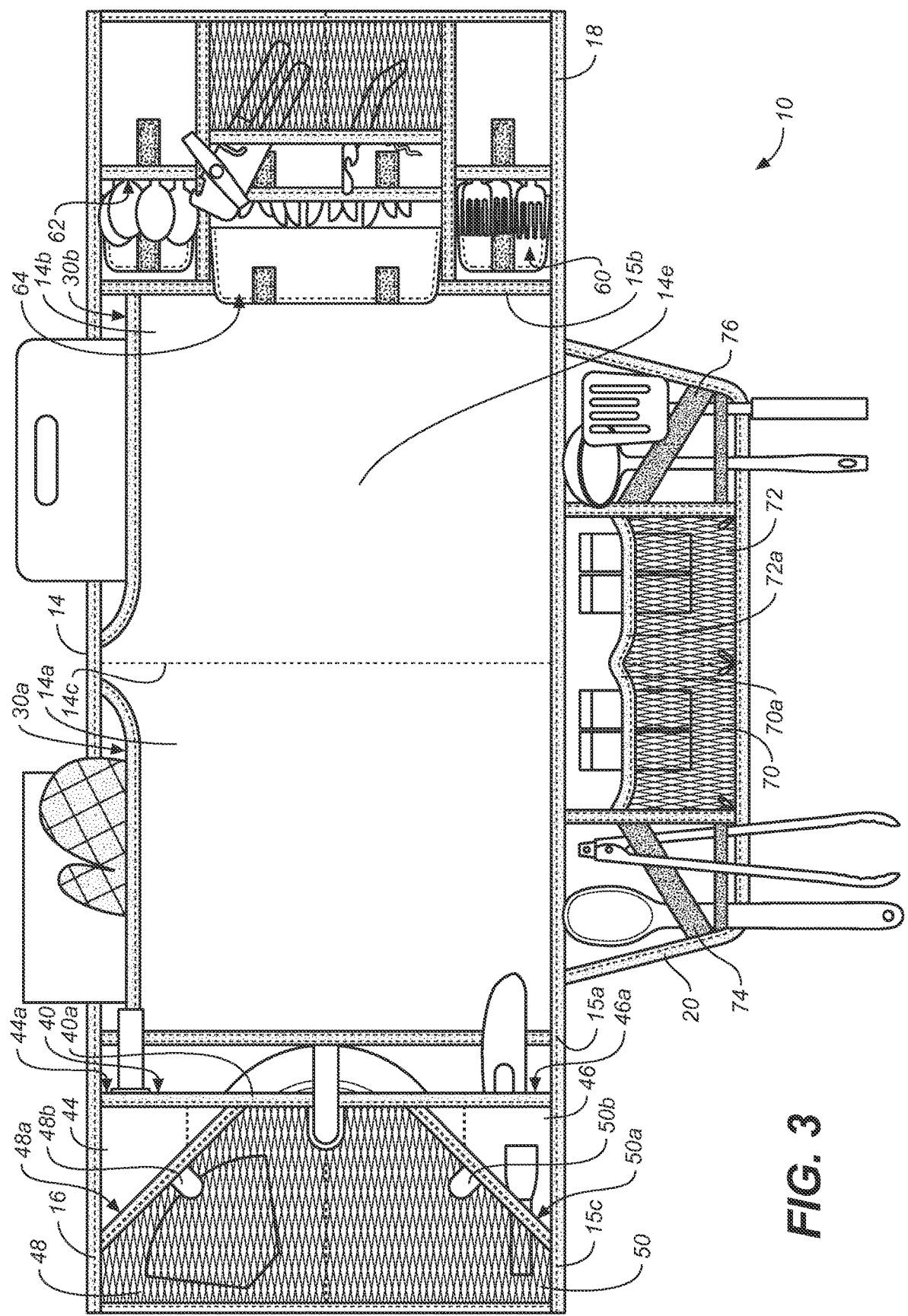
FIG. 3 is the same view as that shown in FIG. 2A, here shown with various kitchen and cooking articles and tools stowed in the caddy pockets and bindings for transport and use.

Looking now at FIGS. 2B-3, and also referring back to FIG. 1, where details of the top side of the caddy are illustrated with the caddy in an open configuration. Shown here are the various structures for stowing and capturing cooking articles, utensils, serveware, dinnerware, silverware, spice containers, and other kitchen and cooking accessories. Among them:

Medial panels 14a, 14b, of the tabletop panel 14 each include a single sleeve 30a, 30b. They may be used to store larger articles, such as cutting boards, tablecloths and dishtowels, potholders and oven mitts, and the like.

Left-side pocket panel 16 drapes over the left side of the picnic table (when looking at the table end on in front of the front pocket panel) and down and toward the picnic table bench PB. In embodiments it has a total of five storage compartments, including a large rear pocket 40 generally intended to hold conventional 10-inch picnic plates, with a 6-inch webbing strap with hook and loop tabs 42 for securing the plates inside the pocket during folding for transport. Straddling the rear pocket 40 on either side are two slender side sleeves 44, 46 with openings having an upper edge 44a, 46a colinear with the upper edge 40a of the rear pocket 40. These two side sleeves are approximately 8½ inches deep and three inches wide and are adapted for holding slightly more elongate articles, such as a long stem lighter or carving knife.

In front of the rear pocket and side sleeves are open mesh pockets 48, 50 sewn over the rear pocket and side sleeves, each mesh pocket having a triangular corner opening 48a, 50a. These enable the user to see the articles stored. Dimensions in embodiments may be approximately 9 inches by 8½ inches. Each mesh pocket has a hook and loop tabs 48b, 50b, for securing items inside.

The right-side pocket panel (best considered with reference to FIGS. 2C and 3) is adapted to be draped over the right side of the picnic table when in use and includes ten storage compartments, comprising six pockets and four sleeves. The dimensions of the total panel are 11 inches by 18 inches, and it is configured to store common household silverware and kitchen utensils and accessories. There are two outside pockets 52, 54 adjacent either side of the panel, each sized in depth to accommodate the average length of table forks and spoons: the dimensions are 6 inches in depth and 3¾ inches wide. There are also two pockets 56, 58 centered between the two outside pockets, each sized to accommodate the average length of a butter knife: the dimensions are 7½ inches deep by 3¾ inches wide. Each of these silverware pockets is equipped with a 5-inch flap 52a, 54a, 56a, with hook and loop tabs 52b, 54b, 56b, for securing the items for packing, folding and transport. They are also sewn over (or on top of) the main base of the fabric creating open sleeves behind each pocket, 60, 62, 64, respectively. Finally, there are two additional open mesh pockets 66, 68 sewn over the bottom half of the central "knife" pockets for additional kitchen accessories, such as a can opener or a corkscrew. The dimensions of the open mesh pockets are 5 inches by 5¾ inches. In combination, the effect is to provide layers of stacked pockets, one atop or in front of another. This enhances the separation of stored articles and helps to prevent utensils from becoming entangled.

The front pocket panel 20 is configured to drape directly over the end of the picnic table when installed (see FIG. 1) and is 26 inches by 7 inches. It includes two open mesh pockets 70, 72 in the central portion of the panel (each 6 inches by 5½ inches), each sized to store spice jars and to provide easy accessibility during cooking. The open mesh material enables users to see spice jar labels. The two open mesh pockets have an elastic upper edge 70*a*, 72*a* to secure articles stored in the pockets, especially during folding and transport.

On the outboard ends of the top panel include bifurcated elastic strips sewn onto the region of the top panel bordering the open mesh pockets. The sewn strips provide elastic loops through which to insert utensil handles while also capturing the utensil and presenting it for easy removal. The loop portions are sized to accommodate cooking tools with elongate handles or working features, such as tongs, spatulas, large serving spoons, etc.

FIG. 3 is a top plan view showing the inventive outdoor table organizer and cooking utensil caddy with various articles stowed, held, or contained in the pockets and other storage structures described above. This, of course, is but one of countless organizing schemes possible using the highly flexible inventive caddy, and users will have little difficulty adapting it to their particular needs. As FIG. 1 shows, the tabletop portion of the caddy is sized not only for placement over a picnic table, but to serve as a platform for placement of a conventional portable two-burner outdoor gas stove. When set up in such a fashion, all of the stored utensils and cooking articles are ready at hand and easily stored so as to keep the cooking area uncluttered and efficient.

FIGS. 4-5 show the outdoor table organizer and cooking utensil caddy in its folded, storage-and-transport configuration. When desired, the front panel 20 may be folded over and onto the tabletop panel 14, the left-side pocket panel 16 may be folded up and onto the left medial panel 14*a*, and the right-side pocket panel 18 may be folded up and onto the right medial panel 14*b*. The tie-down strap 24 must then be uncoupled (if previously secured) and the entire caddy may then be folded in half along the middle folding seam 14*c*. The buckles 26*a*, 26*b* of the tie-down strap are then coupled and adjusted to secure the caddy in its storage-and-transport configuration as a carry bag, and the carry handles 28*a*, 28*b* are exposed and presented at the upper edge of the carry bag.

The above disclosure is sufficient to enable one of ordinary skill in the art to practice the invention and shows embodiments of the invention as presently contemplated by the inventor. While there is provided herein a full and complete disclosure of preferred embodiments of this invention, this disclosure does not limit the invention to the exact construction, dimensional relationships, and operations shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. An outdoor table organizer and cooking utensil caddy having a deployed configuration and a folded storage-and-transport configuration, comprising:
    a generally rectangular fabric panel having an opposed pair of longer sides and an opposed pair of shorter sides partitioned into subpanels and configured for secure placement on an end portion of a picnic tabletop, said subpanels including a central tabletop portion between said pair of longer sides for placement on the picnic tabletop, said central tabletop portion having a top side and a bottom side, a left-side pocket panel and right-side pocket panel arranged along said opposed pair of shorter sides such that in the deployed configuration said left-side pocket panel and said right-side pocket panel drape over the sides of the picnic table, and a front pocket panel arranged to drape from one of said longer sides over the end of the picnic table orthogonal to said left-side pocket panel and said right-side pocket panel in the deployed configuration;
    said front side pocket panel having a first side of a first length joining one of said longer sides along a portion of said central table top portion of said generally rectangular fabric panel;
    said first side of said front side pocket panel being spaced by a separation distance having no panel that is equidistant from said left-side pocket panel and said right-side pocket panel wherein said separation distance does
    said front side pocket panel having a second side second length opposite said first side that is shorter than said first side of said first length whereby opposed sides of said front side pocket panel are tapered away from said first side of said first length;
    a tie-down strap affixed longitudinally to said bottom side of said central tabletop panel, said tie-down strap having free ends with complementary male and female buckles, one each adjustably attached near one of each of said free ends;
    carry handles affixed to said bottom side of said tabletop portion;
    wherein each of said left-side pocket panels, said right-side pocket panel, and said front pocket panel includes a plurality of storage structures for storing, holding, and presenting cooking articles and accessories, serveware and flatware;
    wherein said plurality of storage structures on each of said pocket panels comprises elastic straps, fabric pockets and sleeves, open mesh pockets, or some combination thereof;
    wherein said central tabletop portion is divided by a middle folding seam into a right medial panel and a left medial panel;
    wherein from the deployed configuration, the outdoor table organizer and cooking utensil caddy is placed into the folded storage-and-transport configuration by unbuckling said tie-down strap, folding said front pocket panel up and onto said right and left medial panels, folding said left-side pocket panel up and onto said left medial panel, folding said right-side pocket panel up and onto said right medial panel, folding said right and left medial panels along said middle folding seam so as to approximate said left-side pocket panel and said right-side pocket panel, and buckling said tie-down strap buckles;
    further including a sleeve disposed on said bottom side of said tabletop portion through which said tie-down strap is disposed and into which excess tie-down strap may be stowed;
    wherein said left-side pocket panel joins said left medial panel at a first folding seam, said right-side pocket panel joins said right medial panel at a second folding seam, and said front pocket panel joins said left and right medial panels at a third folding seam at said first side of said first length;
    wherein said carry handles comprise a continuous loop of fabric webbing sewn onto said bottom side of said tabletop panel with opposing loop portions extending over said first and second folding seams;

wherein said left-side pocket panel and said right-side pocket panel each include a plurality of pockets in a stacked configuration; and further including open mesh pockets disposed above said plurality of pockets on said left-side pocket panel and said right-side pocket panel, each of said open mesh pockets having an elastic upper edge.

2. The outdoor table organizer and cooking utensil caddy of claim 1, wherein said base fabric panel is made from a high-tenacity woven nylon or polyester fabric.

* * * * *